United States Patent
Ding et al.

(10) Patent No.: US 8,320,903 B2
(45) Date of Patent: Nov. 27, 2012

(54) METHOD AND SYSTEM FOR CALIBRATING MULTIPLE TYPES OF BASE STATIONS IN A WIRELESS NETWORK

(75) Inventors: Yinong Ding, Plano, TX (US); Cornelius van Rensburg, Dallas, TX (US); Akshaya A. Trivedi, Mountain View, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 1244 days.

(21) Appl. No.: 11/221,190

(22) Filed: Sep. 7, 2005

(65) Prior Publication Data
US 2007/0054699 A1    Mar. 8, 2007

(51) Int. Cl.
*H04W 24/00* (2009.01)
*H04M 7/00* (2006.01)
*H04L 25/03* (2006.01)
*H01Q 3/00* (2006.01)

(52) U.S. Cl. ...... 455/423; 455/561; 455/562.1; 455/552.1; 375/296; 370/338; 342/368

(58) Field of Classification Search ........... 455/423, 455/561, 562.1, 552.1; 375/296; 370/338; 342/368
See application file for complete search history.

(56) References Cited

U.S. PATENT DOCUMENTS

| | | | | |
|---|---|---|---|---|
| 5,335,362 A | * | 8/1994 | Vaisanen et al. | 455/67.11 |
| 5,839,052 A | * | 11/1998 | Dean et al. | 725/106 |
| 5,881,369 A | * | 3/1999 | Dean et al. | 455/78 |
| 5,890,057 A | * | 3/1999 | Dutkiewicz et al. | 455/69 |
| 6,037,898 A | * | 3/2000 | Parish et al. | 342/174 |
| 6,157,343 A | * | 12/2000 | Andersson et al. | 342/371 |
| 6,236,839 B1 | * | 5/2001 | Gu et al. | 455/67.14 |
| 6,259,912 B1 | * | 7/2001 | Si | 455/424 |
| 6,865,393 B1 | * | 3/2005 | Baum et al. | 455/452.2 |
| 7,336,626 B1 | * | 2/2008 | Barratt et al. | 370/281 |
| 2003/0236107 A1 | * | 12/2003 | Azuma | 455/561 |
| 2005/0069020 A1 | * | 3/2005 | Lakkis | 375/130 |
| 2006/0009162 A1 | * | 1/2006 | Tan et al. | 455/67.11 |
| 2006/0240784 A1 | * | 10/2006 | Naguib et al. | 455/73 |

* cited by examiner

*Primary Examiner* — Ariel Balaoing

(57) ABSTRACT

A method of calibrating multiple types of base stations is provided. The method includes selecting one of a plurality of technology types for the wireless base station. The wireless base station has an adaptive antenna array. A calibration is performed for the wireless base station based on the selected technology type.

20 Claims, 12 Drawing Sheets

METHOD AND SYSTEM FOR CALIBRATING MULTIPLE TYPES OF BASE STATIONS IN A WIRELESS NETWORK

CROSS-REFERENCE TO RELATED APPLICATION AND CLAIM OF PRIORITY

The present disclosure is related to that disclosed in U.S. patent application Ser. No. 11/221,088, filed concurrently herewith, entitled "CALIBRATION SYSTEM ARCHITECTURE FOR CALIBRATING MULTIPLE TYPES OF BASE STATIONS IN A WIRELESS NETWORK." U.S. patent application Ser. No. 11/221,088 is assigned to the assignee of the present application. The subject matter disclosed in U.S. patent application Ser. No. 11/221,088 is hereby incorporated by reference into the present disclosure as if fully set forth herein.

TECHNICAL FIELD OF THE INVENTION

The present disclosure relates generally to wireless communications and, more specifically, to a method and system for calibrating multiple types of base stations in a wireless network.

BACKGROUND OF THE INVENTION

In a base station of a wireless communication network, the antenna is the port through which radio frequency (RF) energy is coupled from the transmitter to the outside world and to the receiver from the outside world. By using an array of antennas, a number of benefits are expected including improved directionality, higher signal-to-noise ratio (SNR), and better capability of interference rejection for received signals.

Manufacturers of antenna array systems formerly used signal processors that assumed ideal antenna array characteristics. Therefore, antenna arrays used in association with former signal processors had to achieve high quality standards to perform acceptably, making antenna arrays expensive. Additionally, these antenna array systems experienced degraded performance when temperatures changed, humidity levels changed, or other environmental conditions changed because the characteristics of the antenna array diverged from the expected ideal characteristics under these altered environmental conditions.

Calibration systems play an important role in modern wireless communication systems employing adaptive antenna technologies, for example antenna arrays. Depending on the applications and the signal processing algorithms employed by the base station, antenna array calibration includes determining the characteristics of the RF paths of the base station and using the characteristic data to optimize base station radio transmission and radio reception. In some cases the term "calibration" may be used to refer to the determination of system characteristics, while in other cases the term "calibration" may be used to refer to the use of the characteristic data to optimize base station radio transmission and radio reception. The meaning of the use of the term calibration will be understood by the context in which it is used. The characteristic data may be referred to as calibration data. Smart antenna systems particularly may benefit from the enhanced system performance that can be obtained from calibration.

Modern antenna array systems typically store calibration data that is then used to optimize radio transmission and reception. Conventional methods and systems for obtaining the calibration data, however, have many drawbacks. The known calibration systems may include extensive measuring equipment that is both unwieldy and expensive. Some conventional calibration methods are sensitive to drifts in system parameters, and these drifts lead to inaccuracies in the calibration data obtained using these methods. To avoid these difficulties, some antenna arrays are assigned calibration data that is generic for their particular design but that does not represent the characteristics unique to the individual antenna array. Because conventional calibration methods may be sufficiently time-consuming that periodic recalibration is impractical, some antenna arrays are calibrated only in the factory or upon initial installation, and thereafter their characteristics may diverge from the factory calibration data as the antenna array ages or as environmental conditions change. Antenna arrays that have not been individually and recently calibrated in their current environment may have inaccuracies in their array calibration data that may result in performance degradation.

Current approaches to overcome these difficulties with antenna array calibration techniques may provide a calibration system built into the base station. Calibration methods and systems may be designed that minimize the duration of time required to measure antenna array calibration data. Current calibration systems, however, are typically designed for specific vendors and systems, are manufactured in low volume, and are relatively expensive.

Therefore, there is a need in the art for an improved method for calibrating base stations. In particular, there is a need for a less expensive calibration method that is capable of calibrating base stations that operate using any technology, such as Code Division Multiple Access (CDMA) or Orthogonal Frequency Division Multiplexing (OFDM), and using any operational mode, such as frequency division duplexing (FDD) or time division duplexing (TDD).

SUMMARY OF THE INVENTION

A method of calibrating a wireless base station is provided that includes selecting one of a plurality of technology types for the wireless base station. The wireless base station has an adaptive antenna array. A calibration is performed for the wireless base station based on the selected technology type.

According to one embodiment of the present disclosure, the calibration for the wireless base station includes at least one of a power calibration, a gain calibration, a transmit complex calibration, and a receive complex calibration.

According to another embodiment of the present disclosure, the calibration for the wireless base station is performed by providing a calibration signal to a baseband module of the wireless base station, receiving a transmitted signal based on the calibration signal from the wireless base station, and analyzing the transmitted signal compared to the calibration signal.

According to still another embodiment of the present disclosure, the calibration for the wireless base station is performed by transmitting a calibration signal to the base station, receiving a processed signal based on the calibration signal from a baseband module of the wireless base station, and analyzing the processed signal compared to the calibration signal.

According to yet another embodiment of the present disclosure, one operational mode is selected from a plurality of operational modes for the wireless base station. An operational mode component set corresponding to the selected operational mode is selected from a plurality of operational mode component sets in the wireless base station. The calibration for the wireless base station is performed using the selected operational mode component set.

According to a further embodiment of the present disclosure, the operational modes include at least a frequency division duplexing operational mode and a time division duplexing operational mode.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
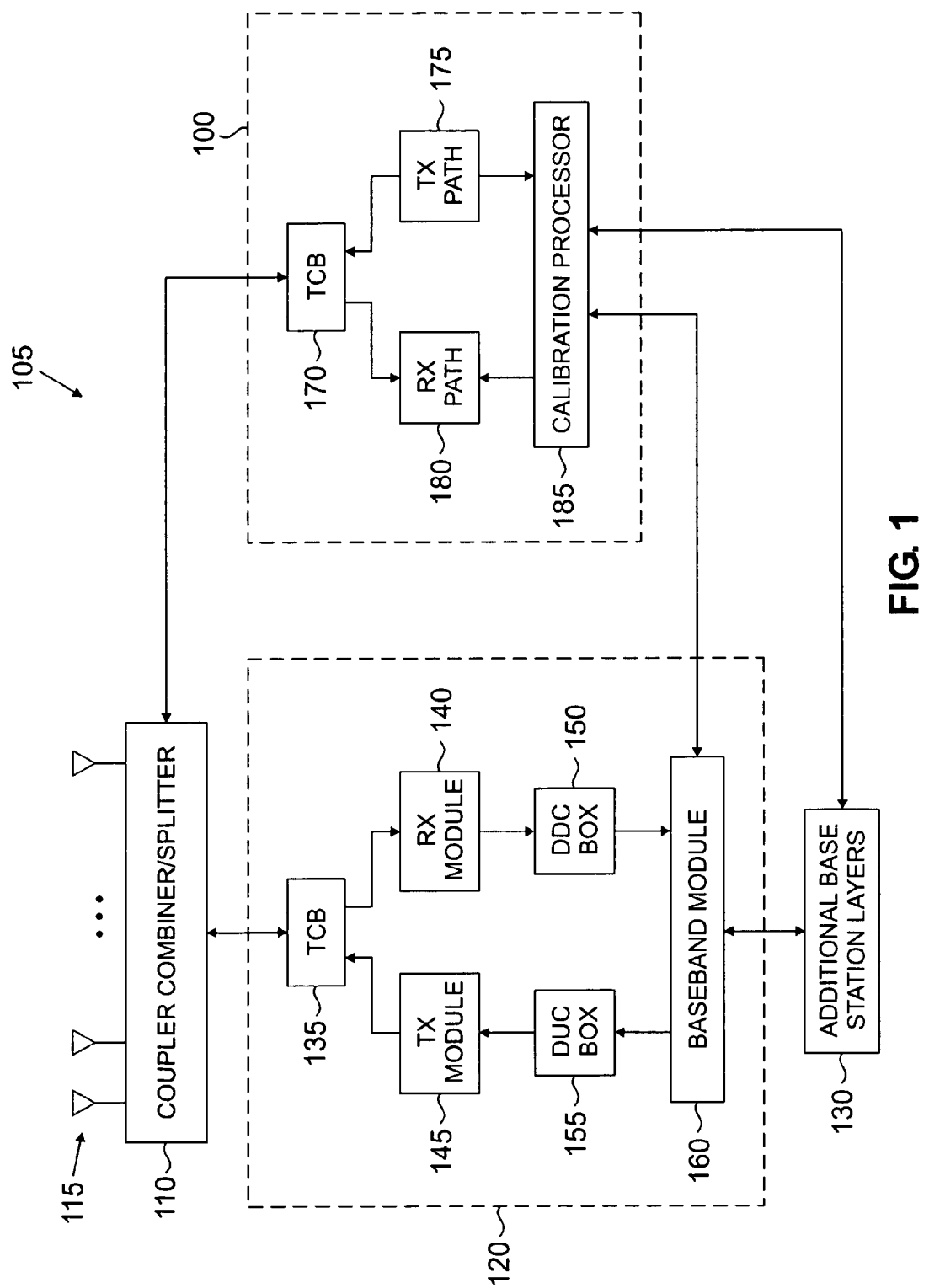
FIG. 1 illustrates a calibration system for an adaptive antenna base station according to one embodiment of the present disclosure.

FIG. 1 illustrates a calibration system 100 for an adaptive antenna base station 105 according to one embodiment of the present disclosure. In addition to calibration system 100, base station 105 comprises a coupler combiner/splitter 110, an adaptive antenna array 115, a plurality of antenna paths 120, and additional base station layers 130. A single antenna path 120 is illustrated for simplicity. However, it will be understood that each antenna of antenna array 115 is associated with a corresponding antenna path 120. In addition, it will be understood that base station 105 may comprise additional components not illustrated in FIG. 1.

Coupler combiner/splitter 110 is operable to couple the adaptive antenna array 115 to the calibration system 100. The plurality of antenna paths 120 are combined when coupling transmitted signals into the calibration system 100; the single output of the calibration system 100 to the coupler combiner/splitter 110 is split by the coupler combiner/splitter 110 when coupling into the plurality of antenna paths 120. The coupler combiner/splitter 110 is designed to ensure the uniform coupling between calibration system 100 and each of the plurality of antenna paths 120. For a particular embodiment, coupler combiner/splitter 110 may use micro-strips to achieve symmetry and uniform coupling between the paths to calibration system, 100 and antenna paths 120. The use of microstrip coupling may assure symmetrical coupling variances due to manufacturing tolerances and/or due to environmental changes, for example temperature changes. For another embodiment, coupler combiner/splitter 110 may use devices based on Micro-Electro-Mechanical System (MEMS) technologies. However, it will be understood that coupler combiner/splitter 110 may use any other suitable technology.

Antenna path 120 comprises a transceiver control box (TCB) 135, a receive (Rx) module 140, a transmit (Tx) module 145, a digital down-converter (DDC) 150, a digital up-converter (DUC) 155, and a baseband module 160. Transceiver control box 135 comprises a plurality of operational mode component sets. For example, transceiver control box 135 may comprise a component set for promoting communication in a frequency division duplexing (FDD) operational mode and a component set for promoting communication in a time division duplexing (TDD) operational mode. However, it will be understood that transceiver control box 135 may comprise any suitable number of any suitable operational mode component sets without departing from the scope of the present disclosure. The operational mode component sets of the transceiver control box 135 are discussed in further detail hereinafter. Transceiver control box 135 may also comprise a switch or other suitable mechanism for inserting or removing each component set such that a single component set is operational at any particular time. DUC 155 comprises a DUC and a digital-to-analog converter (DAC), and DDC 150 comprises a DDC and an analog-to-digital converter (ADC).

Calibration system 100 comprises a transceiver control box (TCB) 170, a transmit path 175, a receive path 180, and a calibration processor 185. Calibration system 100 and/or an operator of calibration system 100 may initiate a calibration of base station 105 based on temperature, weather, base station location, elapsed time since a previous calibration and/or any other suitable calibration indicators.

Transceiver control box 170, like transceiver control box 135, comprises a plurality of operational mode component sets. For example, transceiver control box 170 may comprise an FDD component set and a TDD component set. However, it will be understood that transceiver control box 170 may comprise any suitable number of any suitable operational mode component sets without departing from the scope of the present disclosure. Transceiver control box 170 may also comprise a switch or other suitable mechanism for inserting or removing each component set such that a single component set is operational at any particular time.

The contents of transceiver control box 135 and transceiver control box 170 may be different because transmit path 175 corresponds to the receive path of base station 105, which comprises receive module 140 and DDC 150, and receive path 180 corresponds to the transmit path of base station 105, which comprises transmit module 145 and DUC 155. Thus, in the case of an FDD system, for example, the roles of the transmit and receive filters are reversed. Specifically, if $f_{B_r}$ represents the transmit frequency band for base station 105 and $f_{B_r}$ represents the receive frequency band for base station 105, then transmit path 175 and receive path 180 of calibration system 100 operate in the frequency bands $f_{B_r}$ and $f_{B_r}$, respectively. In addition, transceiver control box 135 may differ from transceiver control box 170 due to transceiver control box 135 being able to handle a power level different from transceiver control box 170.

The calibration process performed by calibration system 100 involves providing a known signal to be processed by receive module 140 and DDC 150 and/or transmit module 145 and DUC 155 in order to calibrate base station 105. Note that in the present disclosure the term "processed" and "processing" may include the modification that a signal may undergo when passing through passive and/or active electrical components or across electrical interfaces. This "processing" may include frequency selective attenuation and phase shift, as well as generation of spurious frequencies based on an input signal. The processed signal waveform is then compared with the known provided signal to obtain calibration data that characterizes the signal paths and their general effects on signals. The calibration data may be stored within base station 105 and used by signal processing components within base station 105 to compensate for non-ideal characteristics of antenna array 115 and/or other radio frequency components in the signal path, for example, providing a gain compensation wherein the gain includes an amplitude component and a phase component. In performing the calibration, two basic operations are involved: the transmit operation and the receive operation.

For the transmit operation, calibration processor 185 provides known signals to baseband modules 160 of base station 105. These signals go through their respective RF units and RF cables in DUC boxes 155, transmit modules 145, and transceiver control box 135, after which the signals reach coupler combiner/splitter 110 and are coupled into calibration system 100. The amplitude of the coupled signal may be substantially less than the signal which passes through to the adaptive antenna array 115, so as to not degrade ongoing communications. The combined signal goes through transceiver control box 170 and receive path 180 and arrives at calibration processor 185. Calibration processor 185 then analyzes the received signal to determine the electrical characteristics of the transmit paths of base station 105, also referred to as the transmit calibration data, and the transmit calibration data may be stored in base station 105. Depending on the results of the analysis, calibration processor 185 may issue certain control commands in order to calibrate base station 105.

For the receive operation, the signal path is reversed, with calibration processor 185 providing a known signal that goes through transmit path 175 and transceiver control box 170, where the signal is coupled into coupler combiner/splitter 110. The signals then travel through their respective RF cables and RF units in transceiver control box 135, receive modules 140, and DDC boxes 150, where they reach the baseband processors in baseband modules 160 of base station 105. Each baseband processor processes the received signal and sends the results to calibration processor 185. Calibration processor 185 will then analyze the results to determine the electrical characteristics of the receive paths of base station 105, also referred to as the receive calibration data, and the receive calibration data may be stored in base station 105. Depending on the results of the analysis, calibration processor 185 may issue certain control commands in order to calibrate base station 105.

Determining transmit and receive electrical characteristics, as described above, and storing the transmit and receive electrical characteristics may be referred to as calibrating antenna array 115 or as calibration. The process of using the stored transmit and receive electrical characteristics to compensate for non-ideal characteristics of base station 105, for example by processing signals with a compensation gain, wherein the gain includes an amplitude component and a phase component, may also be referred to as calibration or calibrating antenna array 115.

Figure 2A:
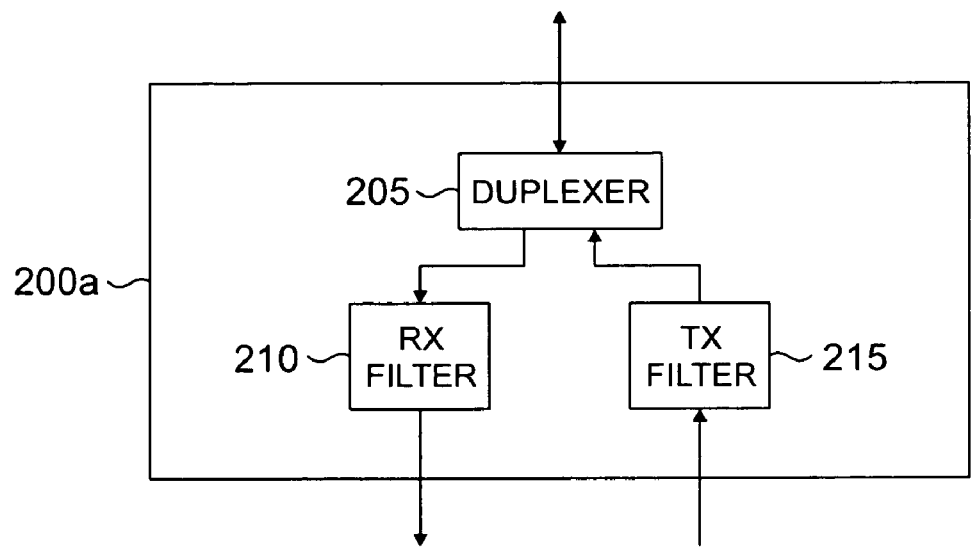
FIGS. 2A and 2B illustrate details of the transceiver control box of FIG. 1 according to one embodiment of the present disclosure.
Figure 2B:
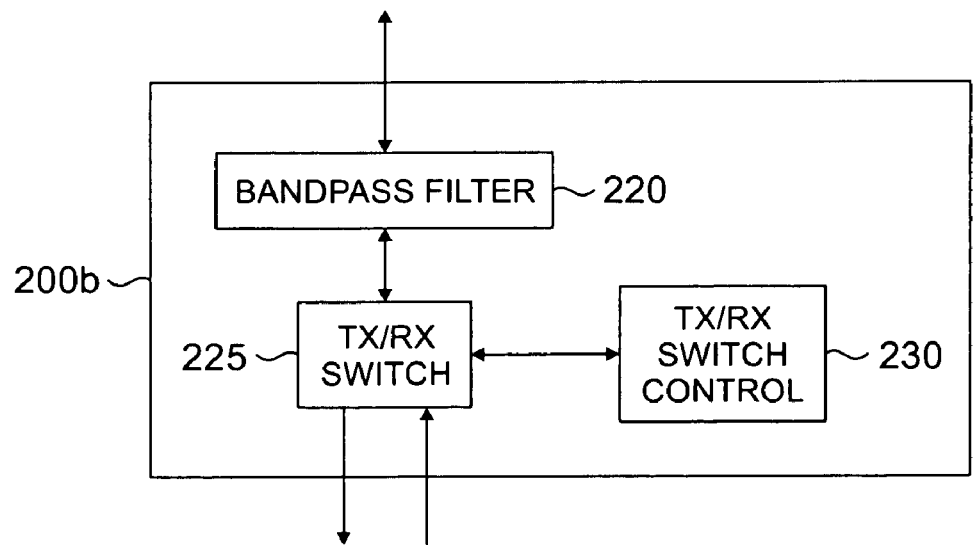

FIGS. 2A and 2B illustrate details of transceiver control box 135 or 170 according to one embodiment of the present disclosure. As described above in connection with FIG. 1, transceiver control boxes 135 and 170 each comprise a plurality of operational mode component sets. For the embodiment illustrated in FIGS. 2A and 2B, transceiver control boxes 135 and 170 each comprise a frequency division duplexing (FDD) component set 200a and a time division duplexing (TDD) component set 200b. It will be understood that, for this embodiment, transceiver control boxes 135 and 170 each comprise both component sets 200a and 200b, each of which is operable to be placed in operation for the corresponding operational mode of base station 105, for example for communicating in a TDD communication mode or in a FDD communication mode.

FIG. 2A illustrates the FDD component set 200a, which comprises a duplexer 205, one or more receive filters 210, and one or more transmit filters 215. The number of receive filters 210 and the number of transmit filters 215 is determined by the multiplicity of the frequency bands in FDD operation mode. FIG. 2B illustrates the TDD component set 200b, which comprises a bandpass filter 220, a transmit/receive switch 225 that is operable to place TDD component set 200b in either a transmit state or a receive state, and a transmit/receive switch control 230 that is operable to control transmit/receive switch 225 in order to select in which state transmit/receive switch 225 will place TDD component set 200b.

Figure 3:
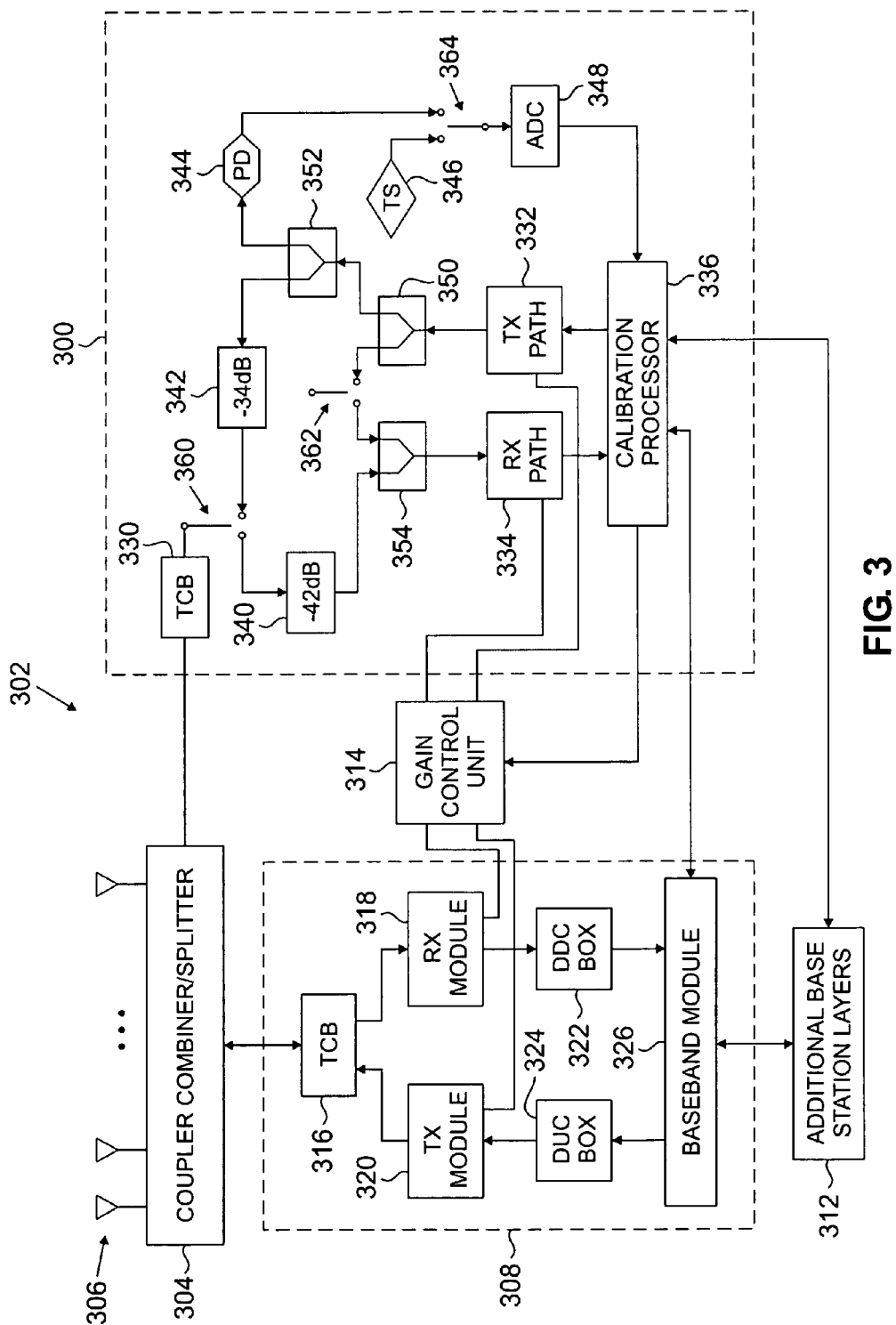
FIG. 3 illustrates a specific embodiment of the calibration system of FIG. 1 in accordance with one embodiment of the present disclosure.

FIG. 3 illustrates a calibration system 300, which is a specific embodiment of calibration system 100, for an adaptive antenna base station 302 according to one embodiment of the present disclosure. For this specific embodiment, transceiver control boxes 135 and 170 are represented by transceiver control boxes 316 and 330, respectively. Transceiver control boxes 316 and 330 each comprise an FDD component set 200a and a TDD component set 200b. The base station 302 may function as a Code Division Multiple Access (CDMA) base station or an Orthogonal Frequency Division Multiplexing (OFDM) base station, which may be referred to as different technology types. However, it will be understood that for other embodiments, transceiver control boxes 316 and 330 may each comprise other or additional component sets 200 and base station 302 may function using any suitable type of technology without departing from the scope of the present disclosure.

In addition to calibration system 300, base station 302 comprises a combiner/splitter 304, an adaptive antenna array 306, a plurality of antenna paths 308, additional base station layers 312, and a gain control unit 314. A single antenna path 308 is illustrated for simplicity; however, it will be understood that each antenna of antenna array 306 comprises a corresponding antenna path 308. In addition, it will be understood that base station 302 may comprise additional components not illustrated in FIG. 3.

Each antenna path 308 comprises a transceiver control box 316, a receive module 318, a transmit module 320, a DDC box 322, a DUC box 324, and a baseband module 326. It will be understood that these components 316, 318, 320, 322, 324 and 326 function in the same manner as the corresponding components 135, 140, 145, 150, 155 and 160, as described above in connection with FIG. 1. Similarly, a transceiver control box 330, a transmit path 332, a receive path 334, and a calibration processor 336 of calibration system 300 each function in the same manner as the corresponding components 170, 175, 180 and 185, as described above in connection with FIG. 1.

In addition to these components, base station 302 comprises the gain control unit 314 that is coupled to each antenna path 308 and to calibration system 300. Gain control unit 314 is operable to control the gain of receivers and transmitters in each of receive module 318, transmit module 320, transmit path 332, and receive path 334 based on signals received from calibration processor 336. Finally, calibration system 300, in addition to components corresponding to calibration system 100, also comprises a −42 dB block 340, a −34 dB block 342, a power detector (PD) 344, a temperature sensor (TS) 346, an analog-to-digital converter (ADC) 348, power combiner/splitter 350, power combiner/splitter 352, power combiner/splitter 354, and switches 360, 362, 364.

The values of −42 dB and −34 dB for blocks 340 and 342 are by way of example only and should not be construed to limit the scope of the present disclosure. These values are not fixed and may change according to system design. It is noted that each of power combiner/splitter 350, power combiner/splitter 352, and power combiner/splitter 354 may operate as a combiner or a splitter depending on the direction of signal flow. However, for the sake of simplicity these items shall be referred to as power combiners 350, 352 and 354 hereafter.

Before any calibration of base station 302, such as a power calibration, a gain calibration, a transmit complex calibration, or a receive complex calibration, is performed, receiver or transmitter gains of calibration system 300 may be properly tuned for a desired base station transmit power level or a desired base station receive sensitivity, respectively, by using a self-calibration process for calibration system 300.

The self-calibration process uses self-calibration signals, which are signals sent from or received by calibration processor 336 to determine the settings of the transmitter and receiver gains. For one embodiment, signals native to base station 302 may be used. However, other types of signals may be used in other embodiments because using base station native signals, such as CDMA signals for CDMA systems or OFDM signals for OFDM systems, may increase the cost and complexity in the design of the self-calibration test platform to obtain factory data for self-calibration. Using more generic signals, such as sinusoids instead of the native signals of base station 302, makes the self-calibration test platform more flexible in order to prepare self-calibration factory data for a variety of systems based on different types of technology. Therefore, a sinusoidal tone or multi-tone signals may preferably be used for self-calibration.

For one embodiment, the self-calibration process may comprise at least two modes: the transmitter self-calibration mode and the receiver self-calibration mode. These are the modes in which the transmitter gain and receiver gain are tuned to the correct settings according to the desired base station receive sensitivity and transmit power level, respectively.

For one embodiment, self-calibration may be performed in two steps. The first step is to perform the transmitter self-calibration, and the second step is to perform the receiver self-calibration. For a particular embodiment, the transmitter self-calibration may be performed as follows. First, the operating frequency, $f_c$, and the required power level at the input to power detector 344, which is denoted as $P_D$, are both determined in accordance with the desired base station receive sensitivity. Next, the temperature of base station 302, $T_b$, is measured using temperature sensor 346. Based on $f_c$, $P_D$ and $T_b$, a desired power detector reading, which is denoted as $D(f_c, P_D, T_b)$, may be obtained from a factory data table or other suitable source.

A self-calibration signal is then transmitted through transmit path 332 by calibration processor 336, and the transmitter gain is adjusted by gain control unit 314 such that the reading of power detector 344 is as close as possible to the desired reading, $D(f_c, P_D, T_b)$, within a predetermined precision. A transmitter gain that meets this condition may be denoted as $G_{tc}$. Next, the transmitter gain, $G_{tc}$, may be recorded and saved by calibration processor 336.

The desired power level at the input to power combiner 354, which is coupled to receive path 334, is determined according to the desired base station transmit power level. Another input to this power combiner 354 is provided by switch 362, which is operable to provide a connection to either power combiner 354 or power combiner 350. The desired power level at the input to power combiner 354 may be denoted as $SP_D$. Based on $f_c$, $SP_D$ and $T_b$, a desired power detector reading, which is denoted as $SD(f_c, P_D, T_b)$, may be obtained from a factory data table or other suitable source.

A self-calibration signal is then transmitted through transmit path 332 by calibration processor 336, and the transmitter gain is adjusted by gain control unit 314 such that the reading of power detector 344 is as close as possible to the desired reading, $SD(f_c, P_D, T_b)$, within a predetermined precision. A transmitter gain that meets this condition may be denoted as $SG_{tc}$. Next, the transmitter gain, $SG_{tc}$, may be recorded and saved by calibration processor 336, which completes the transmitter self-calibration.

For a particular embodiment, the receiver self-calibration may be performed as follows. First, calibration processor 336 and related circuits are set to the state in which they can be both transmitting and receiving. Next, the transmitter gain is set to $SG_{tc}$ by gain control unit 314.

A self-calibration signal is then transmitted through transmit path 332 by calibration processor 336, and the receiver gain is adjusted by gain control unit 314 such that a power-related parameter of the received signal, e.g., the root-mean-square value, is as close as possible to a desired value within a predetermined precision. For a particular embodiment, the predetermined precision may comprise a precision of less than 1.5 dB. The receiver gain that meets this condition may then be denoted as $G_{rc}$. Finally, calibration processor 336 may record and save the receiver gain, $G_{rc}$, which completes the receiver self-calibration.

To perform self-calibration for a TDD system, the same calibration system 300 shown in FIG. 3 may be used without any changes. No additional control messages or actions are needed. However, to perform self-calibration for an FDD system, transmit path 332 and receive path 334 of calibration system 300 operate in the frequency bands $f_{B_r}$ and $f_{B_t}$, respectively. Therefore, the tuning of the transmitter gain, $G_{tc}$, is performed at frequency $f_{B_t}$, while $SG_{tc}$ is obtained in the frequency band $f_{B_r}$. In addition, the RF low order frequencies may be switched from one that corresponds to frequency band $f_{B_r}$ to another that corresponds to frequency band $f_{B_t}$ so that transmit path 332 of calibration system 300 may work in both frequency bands.

FIGS. 4A-I are flow diagrams illustrating a method for calibrating an adaptive antenna base station, such as base station 105 or 302, using calibration system 100 or 300 according to a particular embodiment of the present disclosure. For the following description, base station 302 will be described as being calibrated by calibration system 300; however, it will be understood that the description also applies to base station 105 and calibration system 100.

For this particular embodiment, base station 302 may function as a CDMA base station or as an OFDM base station. However, as previously described, a similar method may be performed for a base station 302 that functions using any other suitable type of technology. In addition, before the calibration method is initiated, it will be understood that calibration system 300 may itself be calibrated, such as by a self-calibration as described above in connection with FIG. 3 or other suitable process. Finally, it will be understood that an operational mode component set 200 corresponding to a same operational mode is selected in both transceiver control box 316 and transceiver control box 330 before any calibration is performed. For example, when a FDD operational mode is selected, the FDD operational mode component set 200a is selected for the transceiver control box 316 as well as for the transceiver control box 330.

Figure 4A:
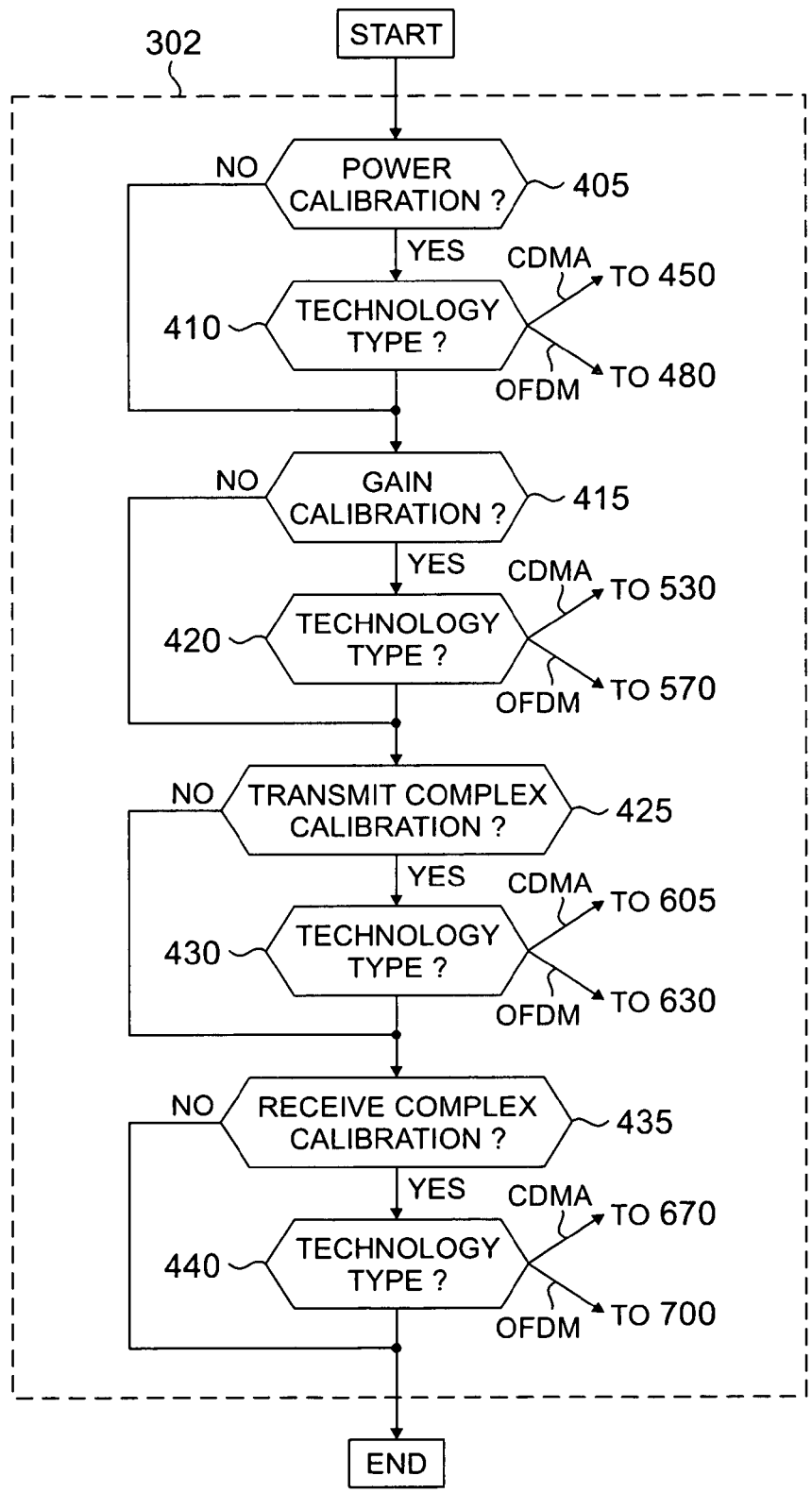
FIGS. 4A-I are flow diagrams illustrating a method for calibrating an adaptive antenna base station using the calibration system of FIG. 1 or 3 according to one embodiment of the present disclosure.
Figure 4B:
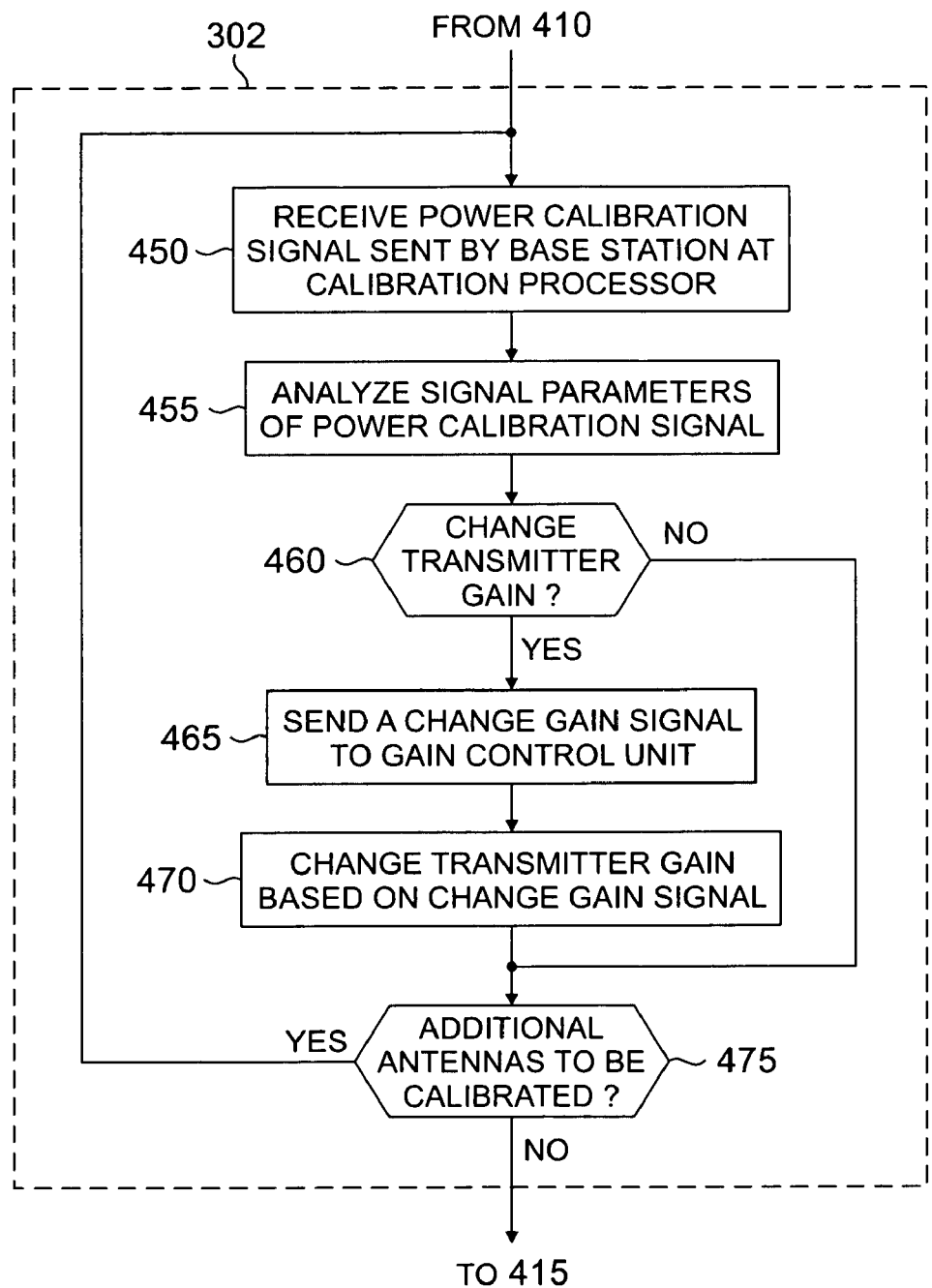
Figure 4C:
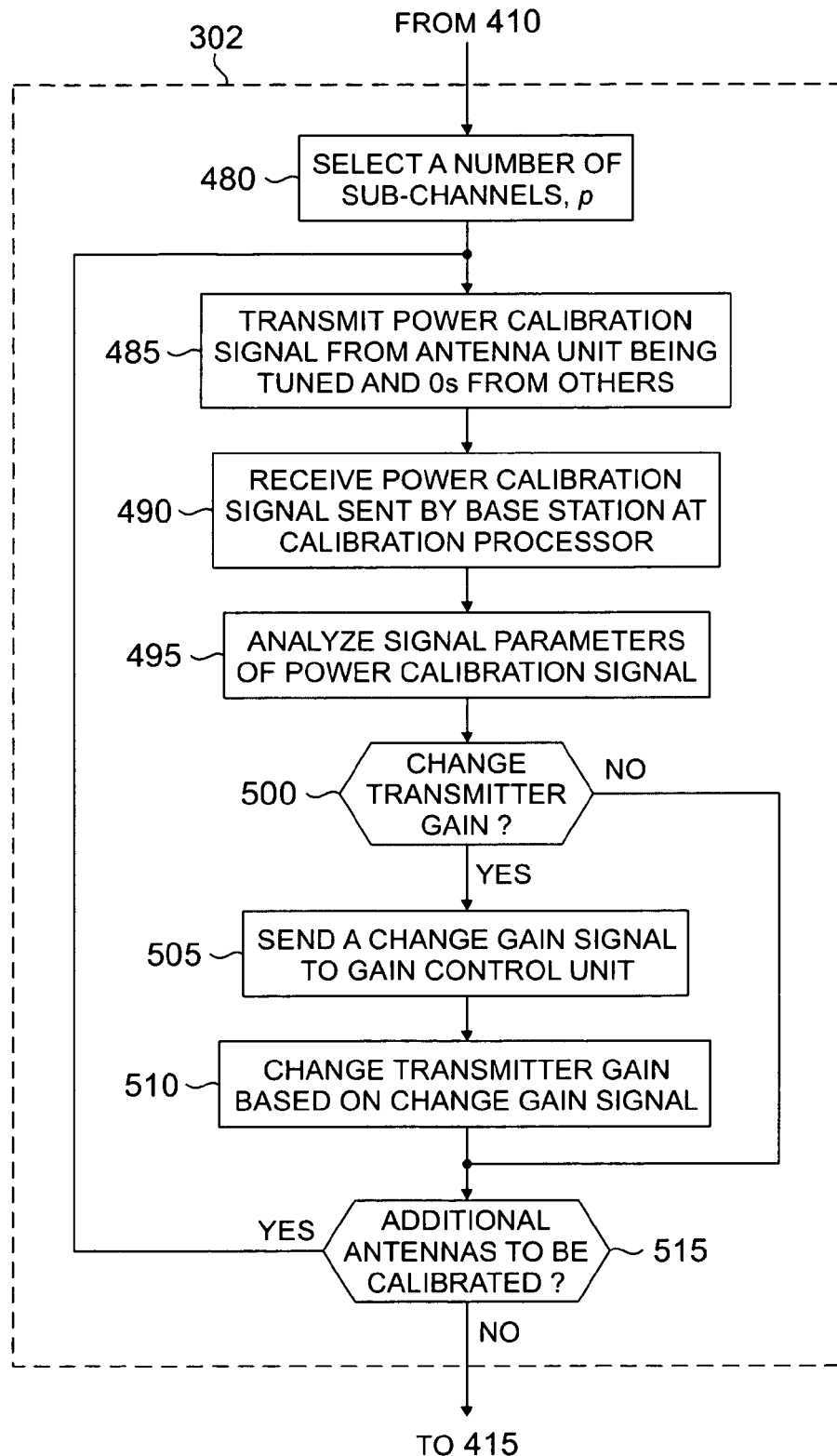
Figure 4D:
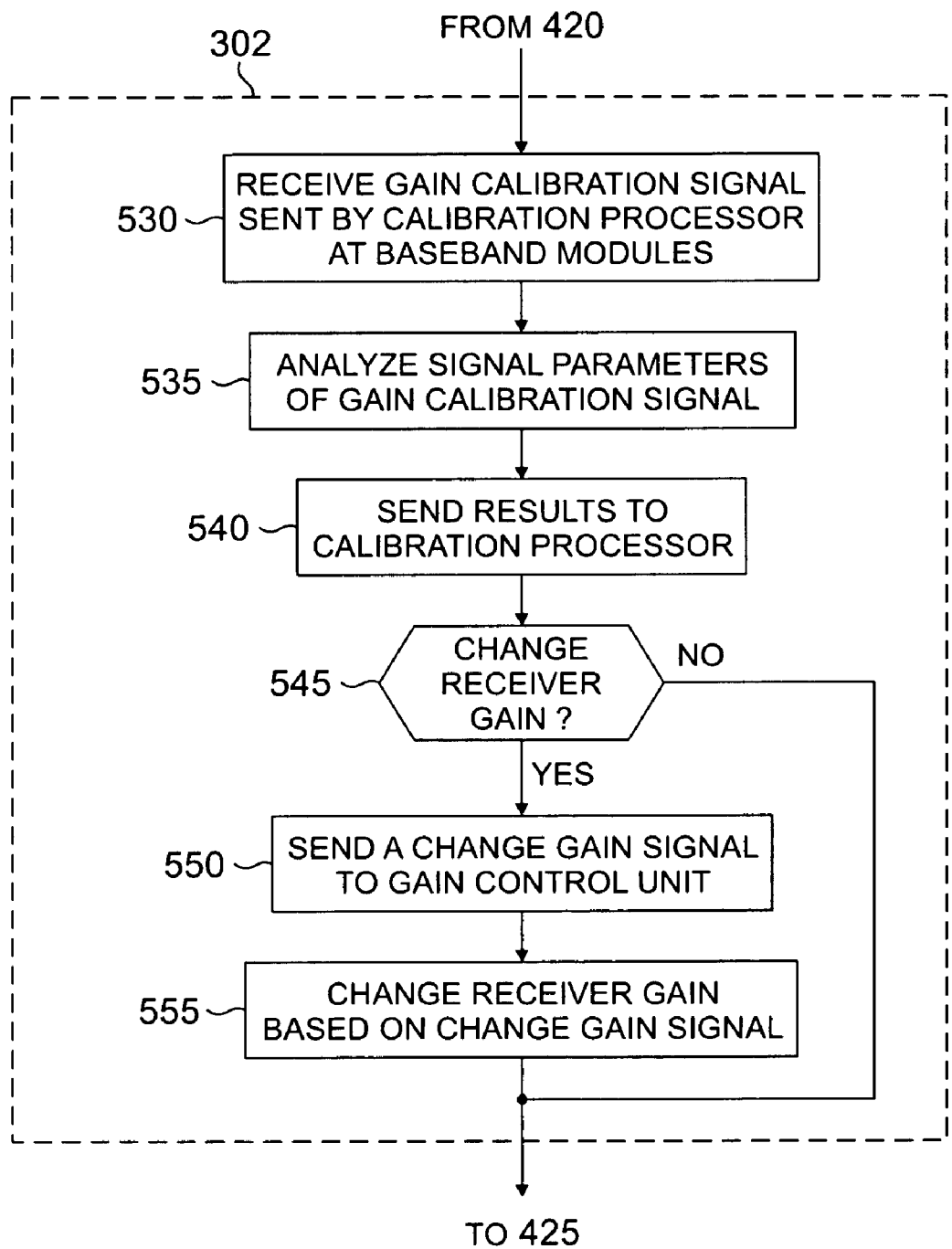
Figure 4E:
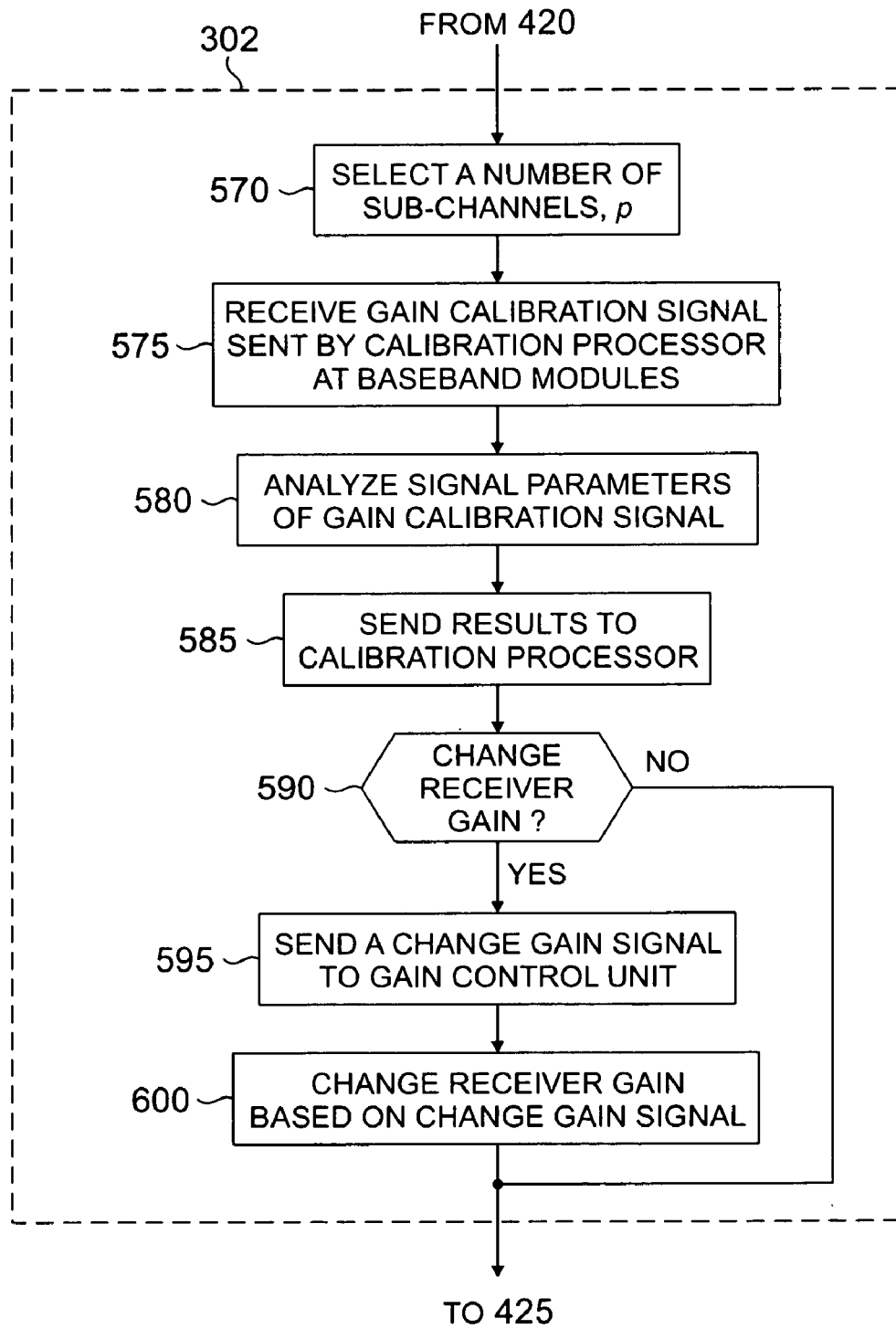

As illustrated in FIG. 4A, any one or all of a power calibration, a gain calibration, a transmit complex calibration, and a receive complex calibration may be performed in a calibration of base station 302. Therefore, for each calibration process, a determination is made regarding which type or types of calibration are to be performed. If a power calibration is to be performed (process step 405), the method illustrated in FIG. 4B is performed for CDMA systems and the method illustrated in FIG. 4C is performed for OFDM systems (process step 410). If a gain calibration is to be performed (process step 415), the method illustrated in FIG. 4D is performed for CDMA systems and the method illustrated in FIG. 4E is performed for OFDM systems (process step 420).

Figure 4F:
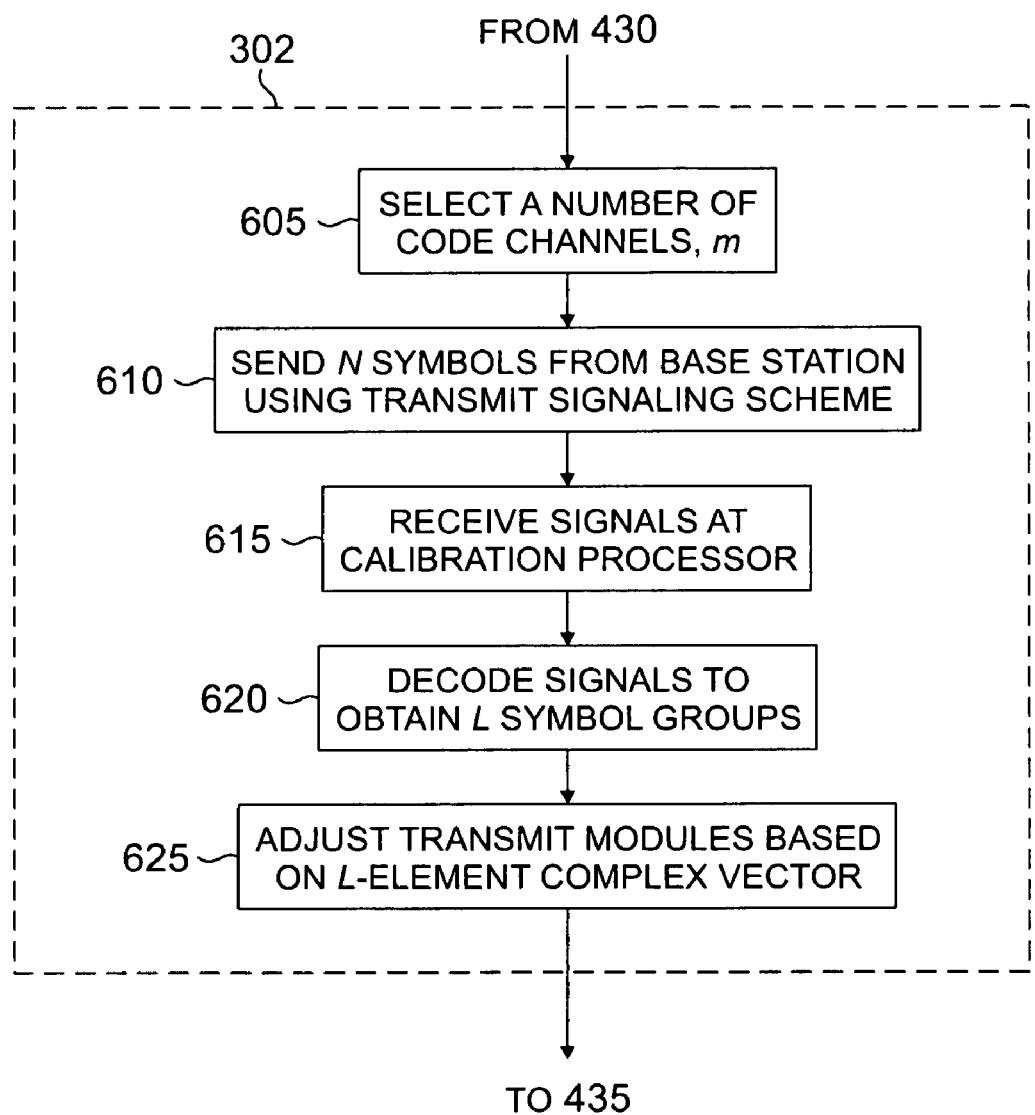
Figure 4G:
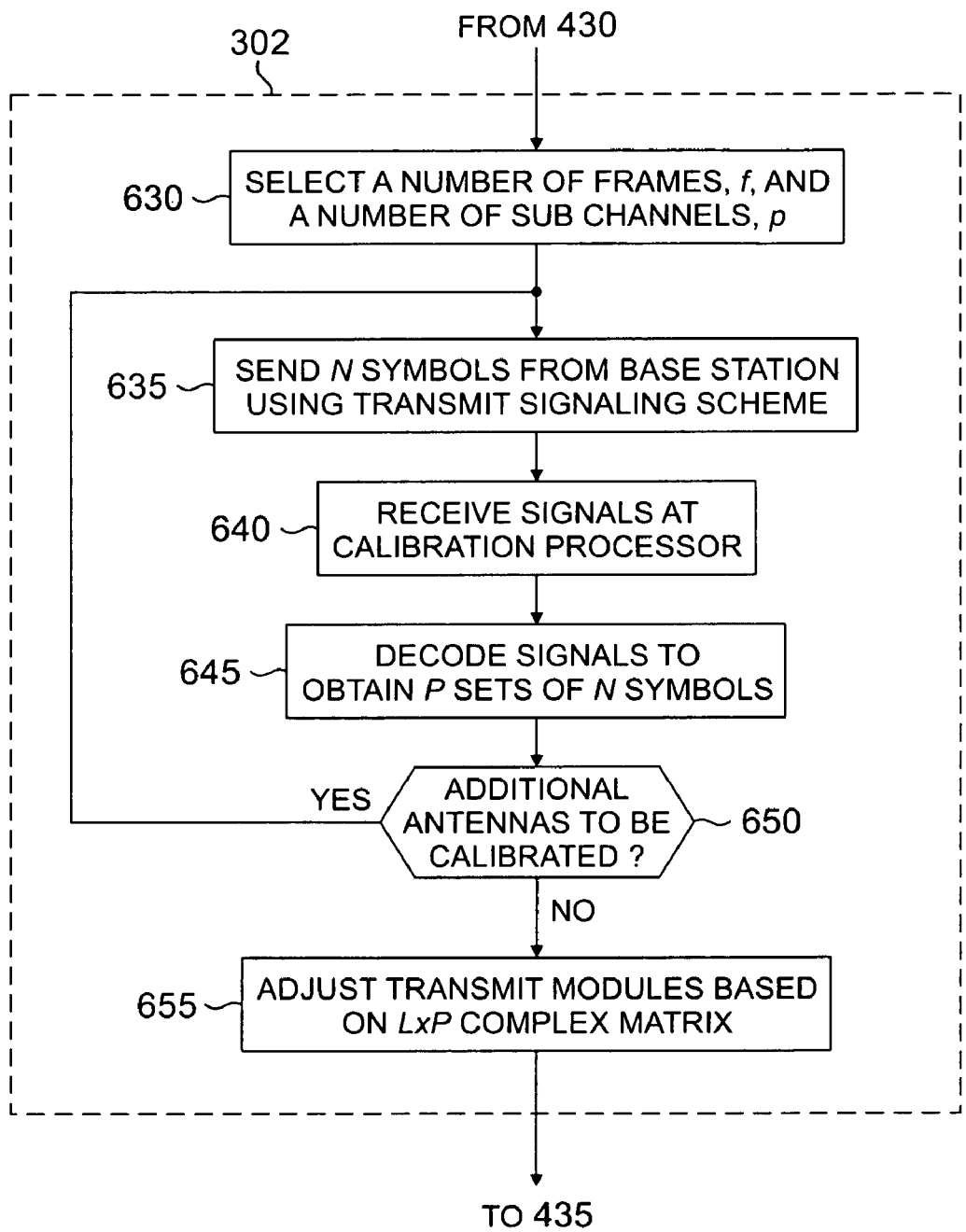
Figure 4H:
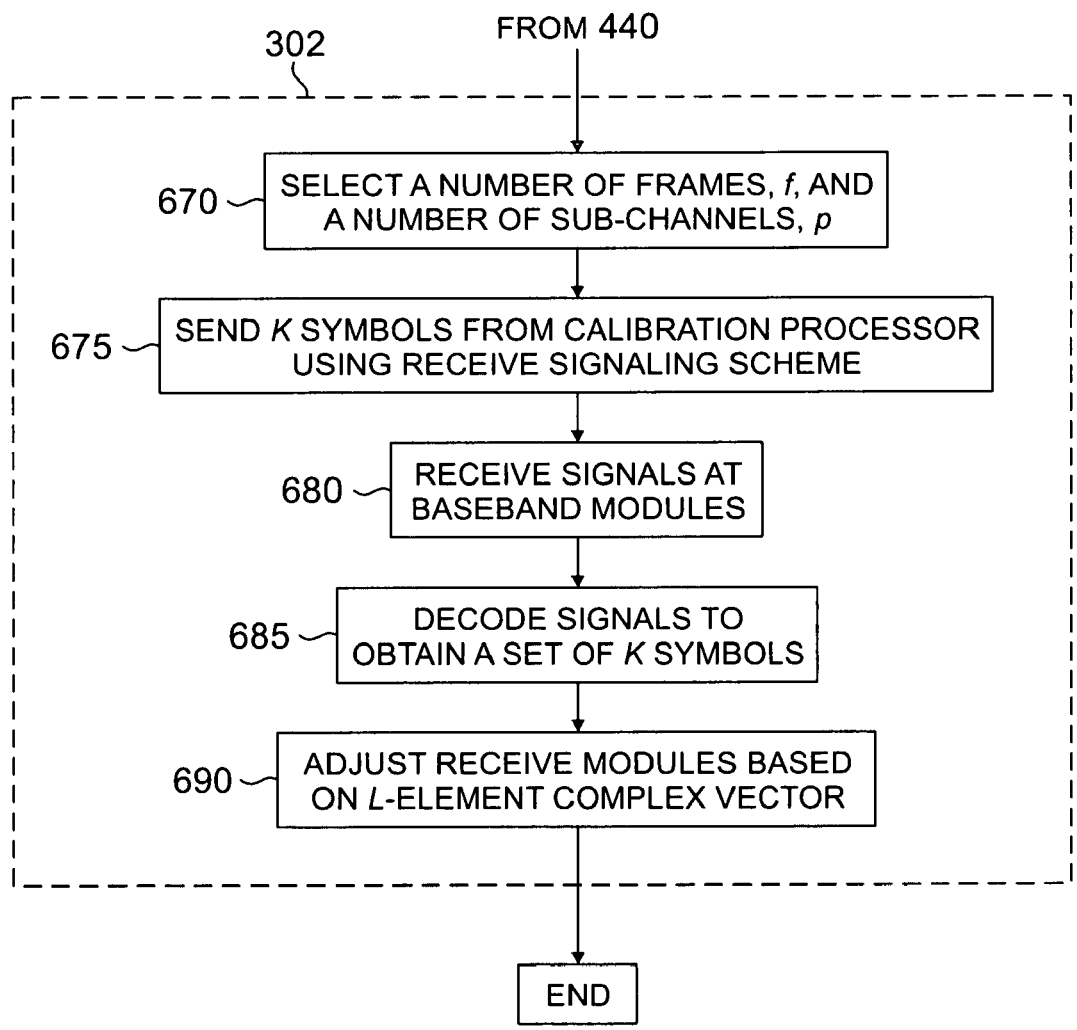
Figure 4I:
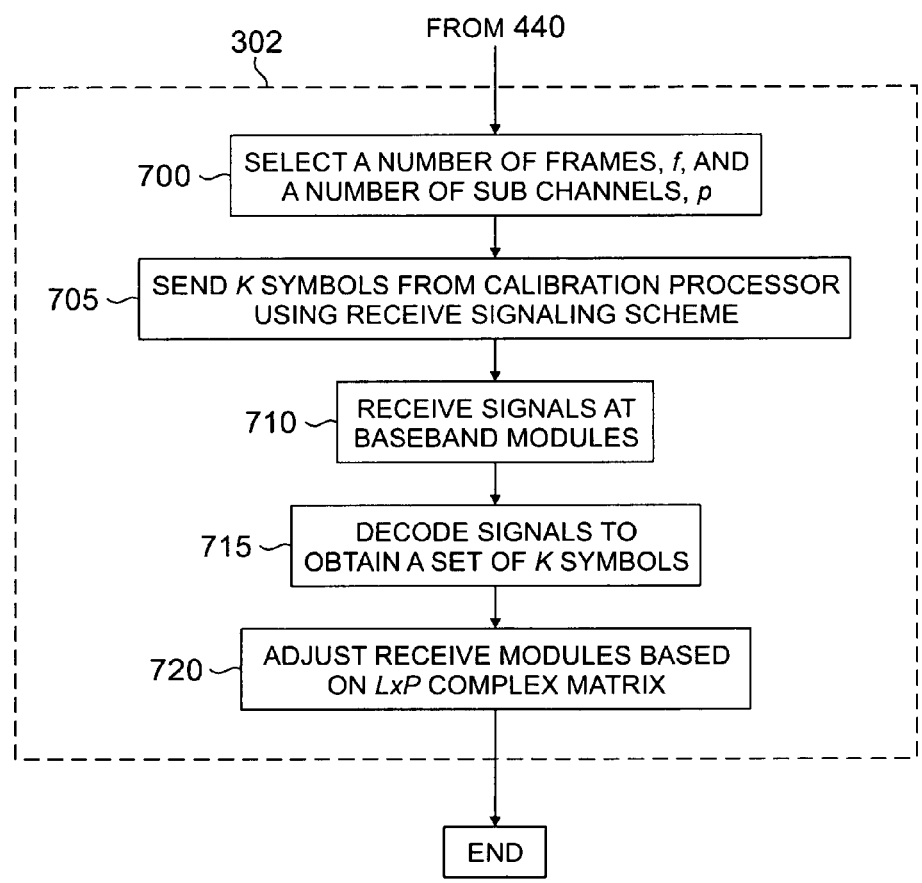

If a transmit complex calibration is to be performed (process step 425), the method illustrated in FIG. 4F is performed for CDMA systems and the method illustrated in FIG. 4G is performed for OFDM systems (process step 430). If a receive complex calibration is to be performed (process step 435), the method illustrated in FIG. 4H is performed for CDMA systems and the method illustrated in FIG. 4I is performed for OFDM systems (process step 440).

For the embodiment in which base station 302 is operating as a CDMA base station, the number of code channels of the CDMA system is assumed to be M and the system bandwidth is assumed to be $f_{CDMA}$. In addition, the system is assumed to be a single-carrier CDMA system. However, the following description of the calibration method for this embodiment may easily be applied to multi-carrier CDMA systems, as well. Finally, as used herein, the term "frame" refers to the basic time interval in the system when a fixed number of signal samples are obtained and processed.

For a transmit signaling scheme for one CDMA embodiment of base station 302, each antenna of antenna array 306 transmits calibration signals in m code channels using a given modulation scheme over the entire frequency bandwidth $f_{CDMA}$, and the condition of $m \leq M/L$ is satisfied, where L is the number of antenna paths 120. For a particular embodiment, antenna array 306 transmits calibration signals using the lowest modulation scheme, such as QAM4. The transmitted calibration signals may be the CDMA waveforms generated by base station 302 using symbols provided by calibration processor 336. This signaling scheme may be used for both power calibration and transmit complex calibration, which are described below in connection with FIGS. 4B and 4F, respectively.

For a receive signaling scheme for one CDMA embodiment of base station 302, calibration processor 336 generates a CDMA signal of bandwidth $f_{CDMA}$ using a given modulation scheme. For a particular embodiment, calibration processor 336 generates a CDMA signal using the lowest modulation scheme, such as QAM4. The signal may occupy one or more code channels. For the case in which the signal occupies only one code channel, the first or last code channel (i.e., code channel 0 or code channel M−1) may be used. This signaling scheme may be used for both gain calibration and receive complex calibration, which are described below in connection with FIGS. 4D and 4H, respectively.

For the embodiment in which base station 302 is operating as an OFDM base station, calibrations similar to those performed for a CDMA base station may be performed. However, several differences exist between the two types of base stations, such as with the transmit aspect due to the fact that, for a CDMA system, all antennas in antenna array 306 may transmit simultaneously across the frequency band but on different code channels so that calibration processor 336 is able to distinguish them. For an OFDM system, however, simultaneous transmission of all antennas in antenna array 306 across the frequency band of base station 302 is implausible, because this may impede communication traffic excessively. This leads to some changes in the calibrations as compared to that described for a CDMA system.

For a transmit signaling scheme for one OFDM embodiment of base station 302, each antenna of antenna array 306 transmits calibration signals in p sub-channels using a given modulation scheme, and the condition of $1 \leq p \leq P$ is satisfied (where P is the total number of sub-channels of the OFDM system). For a particular embodiment, antenna array 306 transmits calibration signals using the lowest modulation scheme, such as QAM4. The calibration signals comprise OFDM waveforms generated by base station 302 using the symbols provided by calibration processor 336. The sub-channels over-which an antenna is transmitting are not used by any other antennas in antenna array 306. In other words, other antennas transmit zeros (zero voltage signals) over those sub-channels. This signaling scheme may be used for both power calibration and transmit complex calibration, which are described below in connection with FIGS. 4C and 4G, respectively.

For a receive signaling scheme for one OFDM embodiment of base station 302, calibration processor 336 generates an OFDM signal using a given modulation scheme. For a particular embodiment, calibration processor 336 generates an OFDM signal using the lowest modulation scheme, such as QAM4. The signal occupies p sub-channels and the condition of $1 \leq p \leq P$ is satisfied. This signaling scheme may be used for both gain calibration and receive complex calibration, which are described below in connection with FIGS. 4E and 4I, respectively.

FIG. 4B illustrates the power calibration method for CDMA systems according to one embodiment of the present disclosure. Power calibration is used to adjust the transmitter gain of the base station RF transmit module 320 such that the signal power at the top of antenna array 306 reaches a desired level. Before beginning the power calibration, the receive gain of the calibration RF receive path 334 may be properly tuned for a given desired base station transmit power level using a self-calibration process, such as that described above in connection with FIG. 3. It will be understood that multiple frames may be used to complete the power calibration.

Initially, calibration processor 336 receives a power calibration signal sent by base station 302 at a given setting of the transmitter gain (process step 450). Calibration processor 336 then analyzes the signal parameters associated with the power of the power calibration signal (process step 455) to determine whether or not to change the transmitter gain (process step 460). The signal parameters associated with the power of the power calibration signal analyzed by calibration processor 336 may comprise the root-mean-square value of the signal waveform, the average energy of the symbols transmitted by base station 302 and/or any other suitable parameters.

If calibration processor 336 determines that the transmitter gain of base station 302 should be increased or decreased based on the analysis (process step 460), calibration processor 336 sends a change gain signal to gain control unit 314 (process step 465). Gain control unit 314 then changes the transmitter gain of base station 302 in accordance with the change gain signal (process step 470). The actual adjustment of the transmitter gain by gain control unit 314 may be adaptive, depending on how close the signal parameters being examined are to the target values. As used herein, "adaptive" means that the gain may be routinely adjusted up or down based on changing conditions in order to keep the performance of base station 302 as close to ideal as possible.

For one embodiment, the power calibration is performed on a per antenna basis. In other words, the power calibration is performed on one antenna path 308 at a time. However, it will be understood that the power calibration may be performed in any suitable manner without departing from the scope of the present disclosure. For the embodiment in which the power calibration is performed on a per antenna basis, when it is determined that additional antennas remain to be calibrated (process step 475), calibration processor 336 receives a power calibration signal sent by base station 302 at a given setting of the transmitter gain from a subsequent antenna (process step 450) and the process repeats until each antenna to be calibrated has been calibrated.

FIG. 4C illustrates the power calibration method for OFDM systems according to one embodiment of the present disclosure. As with a CDMA system, power calibration for this embodiment is used to adjust the transmitter gain of the base station RF transmit module 320 such that the signal power at the top of antenna array 306 reaches a desired level. Before beginning the power calibration, the receive gain of the calibration RF receive path 334 may be properly tuned for a given desired base station transmit power level using a self-calibration process, such as that described above in connection with FIG. 3. It will be understood that multiple frames may be used to complete the power calibration.

Initially, a value is selected for the number of sub-channels, p (process step 480). For a particular embodiment, the value selected for p is equal to P. The antenna being tuned transmits an OFDM power calibration signal across the frequency band of base station 302, while other antennas transmit zeros (zero voltage signals) (process step 485).

Calibration processor 336 receives the power calibration signal sent by base station 302 at a given setting of the transmitter gain (process step 490). Calibration processor 336 then analyzes the signal parameters associated with the power of the power calibration signal (process step 495) to determine whether or not to change the transmitter gain (process step 500). The signal parameters associated with the power of the power calibration signal analyzed by calibration processor 336 may comprise the root-mean-square value of the signal waveform, the average energy of the symbols transmitted by base station 302 and/or any other suitable parameters.

If calibration processor 336 determines that the transmitter gain of base station 302 should be increased or decreased based on the analysis (process step 500), calibration processor 336 sends a change gain signal to gain control unit 314 (process step 505). Gain control unit 314 then changes the transmitter gain of base station 302 in accordance with the change gain signal (process step 510). The actual adjustment of the transmitter gain by gain control unit 314 may be adaptive, depending on how close the signal parameters being examined are to the target values.

For one embodiment, the power calibration is performed on a per antenna basis. In other words, the power calibration is performed on one antenna path 308 at a time. In a particular embodiment, the antennas are tuned sequentially. However, it will be understood that the power calibration may be performed in any suitable manner without departing from the scope of the present disclosure. For example, in some scenarios, one or more, but not all, of the antennas in antenna array 306 may be tuned. For the embodiment in which the power calibration is performed on a per antenna basis, when it is determined that additional antennas remain to be calibrated (process step 515), a subsequent antenna to be tuned transmits an OFDM power calibration signal to be received by calibration processor 336 (process step 485) and the process repeats until each antenna to be calibrated has been calibrated.

FIG. 4D illustrates the gain calibration method for CDMA systems according to one embodiment of the present disclosure. Gain calibration is used to adjust the receiver gain of the base station RF receive module 318 such that the digital signal levels at all ADC outputs reach a desired target value. Before beginning the gain calibration, the transmit gain of the calibration RF transmit path 332 may be properly tuned for a desired base station receive sensitivity using a self-calibration process, such as that described above in connection with FIG. 3. It will be understood that multiple frames may be used to complete the gain calibration.

For one embodiment, the gain calibration is performed on all antenna paths 308 simultaneously. However, it will be understood that the gain calibration may be performed in any suitable manner without departing from the scope of the present disclosure. For the embodiment in which the gain calibration is performed on all antenna paths 308 simultaneously, the baseband module 326 for each antenna path 308 receives a gain calibration signal sent by calibration system 300 at a given power level (process step 530).

Each baseband module 326 then analyzes the signal parameters associated with the power of the gain calibration signal (process step 535) and sends the results to calibration processor 336 (process step 540). The signal parameters associated with the power of the gain calibration signal analyzed by baseband modules 326 may comprise the root-mean-square value of the signal waveform, the average energy of the symbols transmitted by calibration system 300 and/or any other suitable parameters.

Based on the results received from each antenna path 308 through baseband modules 326, calibration processor 336 determines whether or not to change the receiver gain of base station 302 (process step 545). If calibration processor 336 determines that the receiver gain should be increased or decreased (process step 545), calibration processor 336 sends a change gain signal to gain control unit 314 (process step 550). Gain control unit 314 then changes the receiver gain of base station 302 in accordance with the change gain signal (process step 555). The actual adjustment of the receiver gain may be adaptive, depending on how close the signal parameters being examined are to the target values.

FIG. 4E illustrates the gain calibration method for OFDM systems according to one embodiment of the present disclosure. As with a CDMA system, gain calibration for this embodiment is used to adjust the receiver gain of the base station RF receive module 318 such that the digital signal levels at all ADC outputs reach a desired target value. Before beginning the gain calibration, the transmit gain of the calibration RF transmit path 332 may be properly tuned for a desired base station receive sensitivity using a self-calibration process, such as that described above in connection with FIG. 3. It will be understood that multiple frames may be used to complete the gain calibration.

Initially, a value is selected for the number of sub-channels, p (process step 570). For a particular embodiment, the value selected for p is equal to P so that the OFDM signal used for gain calibration is across the frequency band of base station 302.

For one embodiment, the gain calibration is performed on all antenna paths 308 simultaneously. However, it will be understood that the gain calibration may be performed in any suitable manner without departing from the scope of the present disclosure. For the embodiment in which the gain calibration is performed on all antenna paths 308 simultaneously, the baseband module 326 for each antenna path 308 receives a gain calibration signal sent by calibration system 300 at a given power level (process step 575).

Each baseband module 326 then analyzes the signal parameters associated with the power of the gain calibration signal (process step 580) and sends the result to calibration processor 336 (process step 585). The signal parameters associated with the power of the gain calibration signal analyzed by baseband modules 326 may comprise the root-mean-square value of the signal waveform, the average energy of the symbols transmitted by calibration system 300 and/or any other suitable parameters.

Based on the results received from each antenna path 308 through baseband module 326, calibration processor 336 determines whether or not to change the receiver gain of base station 302 (process step 590). If calibration processor 336 determines that the receiver gain should be increased or decreased (process step 590), calibration processor 336 sends a change gain signal to gain control unit 314 (process step 595). Gain control unit 314 then changes the receiver gain of base station 302 in accordance with the change gain signal (process step 600). The actual adjustment of the receiver gain may be adaptive, depending on how close the signal parameters being examined are to the target values.

FIG. 4F illustrates the transmit complex calibration method for CDMA systems according to one embodiment of the present disclosure. For this embodiment, transmit complex calibration is used to obtain an estimate of an L-element complex vector that describes the amplitude variations and phase shifts of the L antenna transmit modules 320.

Initially, a number of code channels, m, used for transmit complex calibration is selected (process step 605). For a particular embodiment, the number of code channels, m, meets the following condition:

$1 \leq m \leq M/L.$

In order to select a proper value of m, some tradeoffs may be considered. For example, the larger the value of m, the larger the pool of symbol samples used for estimating $\hat{w}_l$ and thus the smaller the variance of the estimate. However, when m takes a maximum value, M/L, there will be no code channels available for normal traffic, which means that the normal base station downlink traffic has to be halted temporarily for the frame when the transmit complex calibration is conducted. On the other hand, if the value of m is chosen to be very small to reduce the estimation variance, multiple frames may be needed, which prolongs the duration of the transmit complex calibration.

After a value is selected for m, base station 302 sends a number, N, of symbols using the transmit signaling scheme (process step 610). These symbols may be predetermined or may be produced at the time of calibration by calibration processor 336 and communicated to baseband modules 326 of base station 302.

Calibration processor 336 receives the CDMA signals (process step 615) and decodes them to obtain L symbol groups, each of which contains m·N symbols and corresponds to one of the antennas of antenna array 306 (process step 620). These m·N symbols are the statistical samples for the estimate of one element in the L-element complex vector. If the L-element complex vector is represented by $\underline{w}_t = \{w_0, w_1, \ldots, w_l, \ldots, w_{L-1}\}^T$, where $\{\cdot\}^T$ indicates the vector transpose, and $\underline{\hat{c}}_l = \{\hat{c}_{l,0}, \hat{c}_{l,1}, \ldots, \hat{c}_{l,mN-1}\}^T$ represents the group of decoded symbols corresponding to the l-th antenna, then the estimates of the elements in $\underline{w}_t$ may be obtained as follows:

$$\hat{w}_l = \frac{1}{mN} \sum_{n=0}^{mN-1} \{\hat{c}_{l,n}/c_{l,n}\}, \quad l = 0, 1, \cdots, L-1,$$

where $c_{l,n}$ is the known, transmitted symbol corresponding to $\hat{c}_{l,n}$. In addition, if any knowledge of the noise statistics of $\hat{\underline{c}}_l$ is available, a better estimate of $\hat{w}_l$ may be obtained by taking advantage of the noise statistics. Transmit modules 320 may then be adjusted based on the L-element complex vector, if needed (process step 625).

FIG. 4G illustrates the transmit complex calibration method for OFDM systems according to one embodiment of the present disclosure. For this embodiment, transmit complex calibration is used to obtain an estimate of an L×P complex matrix that describes the amplitude variations and phase shifts of the L antenna transmit modules 320 over P OFDM sub-channels.

Initially, a number of frames, f, and a number of sub-channels, p, are selected (process step 630). Tradeoffs between the number of frames, f, which reflects the length of the calibration, and the number of sub-channels, p, which reflects the part of the downlink sub-channels being used for calibration and which therefore cannot be used for normal traffic, may be considered. Each set of N symbols is associated with one of P OFDM sub-channels. These N symbols are the statistical samples for the estimate of one element in the l-th row of the L×P complex matrix. The corresponding estimate may be obtained by simple averaging or by taking advantage of the noise statistics of the statistical samples, if available.

After values are selected for f and p, base station 302 sends a number, N, of symbols using the transmit signaling scheme (process step 635). These symbols may be predetermined or may be produced at the time of calibration by calibration processor 336 and communicated to baseband modules 326 of base station 302. Calibration processor 336 receives the OFDM signals (process step 640) and decodes them to obtain P sets of N symbols after f frames, which correspond to the l-th antenna being calibrated and from which the L×P complex matrix may be generated (process step 645).

For one embodiment, the transmit complex calibration is performed one antenna at a time. In order to avoid a complete halt of downlink traffic flow, the transmit complex calibration of each antenna path 308 may be performed over the selected number of frames, f. Each frame measures the amplitudes and phase shifts of the corresponding antenna path 308 over p OFDM sub-channels. In general, f·p=P. For the embodiment in which the transmit complex calibration is performed on a per antenna basis, when it is determined that additional antennas remain to be calibrated (process step 650), base station 302 sends a number, N, of symbols using the transmit signaling scheme from a subsequent antenna (process step 635) and the process repeats until each antenna to be calibrated has been calibrated. Once each antenna to be calibrated has been calibrated (process step 650), transmit modules 320 may then be adjusted based on the L×P complex matrix, if needed (process step 655).

FIG. 4H illustrates the receive complex calibration method for CDMA systems according to one embodiment of the present disclosure. For this embodiment, receive complex calibration is used to obtain an estimate of an L-element complex vector that describes the amplitude variations and phase shifts of the L antenna receive modules 318.

Initially, a number of frames, f, and a number of sub-channels, p, are selected (process step 670). Tradeoffs between the number of frames, f, which reflects the length of the calibration, and the number of sub-channels, p, which reflects the part of the uplink sub-channels being used for calibration and which therefore cannot be used for normal traffic, may be considered.

After values are selected for f and p, calibration processor 336 sends a number, K, of symbols using the receive signaling scheme (process step 675). These symbols may be predetermined or may be generated at the time of calibration by calibration processor 336.

For one embodiment, the receive complex calibration is performed on all antenna paths 308 simultaneously. However, it will be understood that the receive complex calibration may be performed in any suitable manner without departing from the scope of the present disclosure. For the embodiment in which the receive complex calibration is performed on all antenna paths 308 simultaneously, the baseband module 326 for each antenna path 308 receives CDMA signals sent by calibration system 300 (process step 680).

Each baseband module 326 then decodes the signals to obtain a set of K symbols (process step 685). These K symbols are the statistical samples for the estimate of one element in the L-element complex vector. If the L-element complex vector is represented by $\underline{w}_r=\{v_0, v_1, \ldots, v_l, \ldots, v_{L-1}\}^T$, where $\{\cdot\}^T$ indicates the vector transpose and $\hat{d}_l=\{\hat{d}_{l,0}, \hat{d}_{l,1}, \ldots, \hat{d}_{l,K-1}\}^T$ represents the set of decoded symbols corresponding to the l-th antenna, then the estimates of the elements in $\underline{w}_r$ may be obtained as follows:

$$\hat{v}_l = \frac{1}{K}\sum_{k=0}^{K-1}\{\hat{d}_{l,k}/d_{l,k}\}, \quad l=0,1,\cdots,L-1,$$

where $d_{l,k}$ is the known, transmitted symbol corresponding to $\hat{d}_{l,k}$. In addition, if any knowledge of the noise statistics of $\hat{d}_l$ is available, a better estimate of $\hat{v}_l$ may be obtained by taking advantage of the noise statistics. Receive modules 318 may then be adjusted based on the L-element complex vector, if needed (process step 690).

FIG. 4I illustrates the receive complex calibration method for OFDM systems according to one embodiment of the present disclosure. For this embodiment, receive complex calibration is used to obtain an estimate of an L×P complex matrix that describes the amplitude variations and phase shifts of the L antenna receive modules 318 over P OFDM sub-channels.

Initially, a number of frames, f, and a number of sub-channels, p, are selected (process step 700). For one embodiment, the receive complex calibration is performed on all antennas in antenna array 306 simultaneously. In order to avoid a complete halt of uplink traffic flow, the number of sub-channels, p, used for the receive complex calibration may be selected to be less than the total number of sub-channels of the OFDM system, P. The receive complex calibration is completed after f frames, and f and p may be chosen such that f·p=P. Tradeoffs between the number of frames, f, which reflects the length of the calibration, and the number of sub-channels, p, which reflects the part of the uplink sub-channels being used for calibration and which therefore cannot be used for normal traffic, may be considered.

After values are selected for f and p, calibration processor 336 sends a number, K, of symbols using the receive signaling scheme (process step 705), and baseband modules 326 receive the signals from calibration processor 336 (process step 710). The K symbols may be predetermined or may be produced at the time of calibration by calibration processor 336.

At the end of f frames, each of the baseband modules 326 corresponding to one of the antennas decodes the signals to obtain P sets of K symbols from which the L×P complex matrix may be generated (process step 715). Each set of K symbols is the set of statistical samples for the estimate of one element in the l-th row of the L×P complex matrix. The corresponding estimate may be obtained by simple averaging or by taking advantage of the noise statistics of the statistical samples, if available. Receive modules 318 may then be adjusted based on the L×P complex matrix, if needed (process step 720).

As previously described, every calibration mode need not be performed each time a calibration process is initiated. Instead, a partial calibration, which is a calibration process that involves some but not all calibration modes, may be performed when appropriate. For example, a partial calibration process may comprise (i) transmitter and receiver self-calibrations, (ii) transmitter and receiver self-calibrations, followed by power and gain calibrations, (iii) transmit and receive complex calibrations, or (iv) any other suitable combination of calibrations.

While several embodiments have been provided in the present disclosure, it should be understood that the disclosed systems and methods may be embodied in many other specific forms without departing from the spirit or scope of the present disclosure. The exemplary embodiments disclosed are to be considered as illustrative and not restrictive, and the intention is not to be limited to the details given herein. It is intended that the disclosure encompass all alternate forms within the scope of the appended claims along with their full scope of equivalents.

What is claimed is:

1. A calibration system for calibrating a wireless base station, comprising:
    a transmit path operable to transmit signals to the wireless base station for calibrating a receive module of the wireless base station and for calibrating a receive sensitivity for the wireless base station;
    a receive path operable to receive signals transmitted by the wireless base station for calibrating a transmit module of the wireless base station and for calibrating a transmit power level for the wireless base station; and a calibration processor coupled to the transmit path and to the receive path, the calibration processor configured to operate in a plurality of technology types and operable to issue control commands to perform a calibration for the wireless base station based on a technology type for the wireless base station, the technology type selected from the plurality of technology types, wherein when the calibration processor operates in a Code Division Multiple Access (CDMA) technology type, the calibration processor selects a number of CDMA code channels for the calibration, and when the calibration processor operates in an Orthogonal Frequency Division Multiplexing (OFDM) technology type, the calibration processor selects a number of OFDM sub-channels for each of a plurality of antennas for the calibration.

2. The calibration system as set forth in claim 1, the calibration processor operable to perform the calibration by performing at least one of a power calibration, a gain calibration, a transmit complex calibration, and a receive complex calibration.

3. The calibration system as set forth in claim 1, wherein when the calibration processor operates in the CDMA technology type, the calibration processor selects only one code channel for the calibration, and when the calibration processor operates in the ODFM technology type, the OFDM sub-channels selected for each antenna by the calibration processor for the calibration are not used by the other antennas.

4. The calibration system as set forth in claim 1, further comprising:
  a power detector operable to generate an analog power detector signal;
  a temperature sensor operable to generate an analog temperature sensor signal;
  an analog-to-digital converter (ADC) coupled to the power detector and to the temperature sensor, the ADC operable to receive the power detector signal and the temperature sensor signal and to generate a digital ADC signal based on one of the power detector signal and the temperature sensor signal; and
  the calibration processor coupled to the ADC and operable to receive the digital ADC signal from the ADC and to perform the calibration based on the digital ADC signal.

5. The calibration system as set forth in claim 1, the calibration processor coupled to a gain control unit, the gain control unit operable to adjust a transmitter gain and a receiver gain for the wireless base station.

6. The calibration system as set forth in claim 1, further comprising a transceiver control box coupled to the wireless base station, the transceiver control box comprising a plurality of operational mode component sets, wherein the transceiver control box is configured to perform the steps of:
  selecting one operational mode from a plurality of operational modes for the wireless base station, the plurality of operational modes comprising at least a frequency division duplexing operational mode and a time division duplexing operational mode;
  selecting one operational mode component set from the plurality of operational mode component sets corresponding to the selected operational mode from; and
  performing the calibration for the wireless base station comprising performing the calibration using the selected one operational mode component set.

7. The calibration system as set forth in claim 6, further comprising a first power combiner/splitter coupled between the transceiver control box and the transmit path and a second power combiner/splitter coupled between the transceiver control box and the receive path.

8. The calibration system as set forth in claim 1, wherein the technology selected from the plurality of technology types is the CDMA technology type for the wireless base station, and wherein the calibration processor is operable to perform a power calibration, the power calibration comprising:
  receiving a power calibration signal from the wireless base station;
  analyzing at least one signal parameter of the power calibration signal to generate a result; and
  determining whether to change a transmitter gain for the wireless base station based on the result.

9. The calibration system as set forth in claim 1, wherein the technology selected from the plurality of technology types is the CDMA technology type for the wireless base station, and wherein the calibration processor is operable to perform a gain calibration, the gain calibration comprising:
  receiving a gain calibration signal;
  analyzing at least one signal parameter of the gain calibration signal to generate a result; and
  determining whether to change a receiver gain for the wireless base station based on the result.

10. The calibration system as set forth in claim 1, wherein the technology selected from the plurality of technology types is the CDMA technology type for the wireless base station, and wherein the calibration processor is operable to perform a transmit complex calibration, the transmit complex calibration comprising:
  selecting a number of code channels for the calibration;
  transmitting a signal comprising a plurality of symbols from the wireless base station in the selected number of code channels;
  receiving the signal by the calibration processor;
  decoding the received signal to generate a complex vector; and
  determining whether to change one or more transmitter gains for the wireless base station based on the complex vector.

11. The calibration system as set forth in claim 1, wherein the technology selected from the plurality of technology types is the CDMA technology type for the wireless base station, and wherein the calibration processor is operable to perform a receive complex calibration.

12. The calibration system as set forth in claim 1, wherein the technology selected from the plurality of technology types is the OFDM technology type for the wireless base station, and wherein the calibration processor is operable to perform a power calibration, the power calibration comprising:
  selecting a number of sub-channels for the calibration;
  transmitting in succession a power calibration signal from each of a plurality of antennas in the wireless base station using the selected number of sub-channels;
  receiving in succession each of the power calibration signals at the calibration processor;
  analyzing in succession at least one signal parameter of each of the power calibration signals to generate a result; and
  determining in succession whether to change a transmitter gain for each antenna in the wireless base station based on the result.

13. The calibration system as set forth in claim 1, wherein the technology selected from the plurality of technology types is the OFDM technology type for the wireless base station, and wherein the calibration processor is operable to perform a gain calibration.

14. The calibration system as set forth in claim 1, wherein the technology selected from the plurality of technology types is the OFDM technology type for the wireless base station, and wherein the calibration processor is operable to perform a transmit complex calibration, the transmit complex calibration comprising:
  receiving in succession a signal comprising a plurality of symbols from each of a plurality of antennas in a wireless base station;
  decoding in succession each of the received signals to generate a complex matrix; and
  determining whether to change a transmitter gain for each antenna in the wireless base station based on the complex matrix.

15. The calibration system as set forth in claim 1, wherein the technology selected from the plurality of technology types is the OFDM technology type for the wireless base station, and wherein the calibration processor is operable to perform a receive complex calibration, the receive complex calibration comprising:
  selecting a number of frames and a number of sub-channels for the calibration; and
  sending a signal comprising a plurality of symbols to the wireless base station using the selected number of frames and the selected number of sub-channels.

16. The calibration system as set forth in claim 1, the calibration processor operable to issue control commands to perform a calibration comprising providing a calibration signal to a baseband module of the wireless base station, receiving a transmitted signal based on the calibration signal from the wireless base station, and analyzing the transmitted signal compared to the calibration signal.

17. The calibration system as set forth in claim 1, the calibration processor operable to perform a calibration comprising transmitting a calibration signal to the base station, receiving a processed signal based on the calibration signal from a baseband module of the wireless base station, and analyzing the processed signal compared to the calibration signal.

18. An apparatus for use in a base station in a wireless communications system, the apparatus comprising:
  a transceiver control box adapted to couple to a plurality of base station antennas;
  a transmit path coupled to said transceiver control box;
  a receive path coupled to said transceiver control box;
  a calibration processor coupled to said transmit path and said receive path, said calibration processor configured to operate in both CDMA and OFDM technology types and operable to perform a calibration for said base station, said calibration processor configured to:
    select one of a Code Division Multiple Access (CDMA) technology type and an Orthogonal Frequency Division Multiplexing (OFDM) technology type for the wireless base station, the wireless base station comprising an adaptive antenna array;
    select one operational mode from a plurality of operational modes for the wireless base station;
    select an operational mode component set corresponding to the selected operational mode from a plurality of operational mode component sets in the wireless base station, the operational modes comprising at least a frequency division duplexing operational mode and a time division duplexing operational mode; and
    perform a calibration for the wireless base station based on the selected technology type and using the selected operational mode component set,
  wherein when the calibration processor performs the calibration based on the CDMA technology type, the calibration processor selects a number of CDMA code channels for the calibration, and when the calibration processor performs the calibration in the OFDM technology type, the calibration processor selects a number of OFDM sub-channels for each of the base station antennas for the calibration.

19. An apparatus for use in a base station in a wireless communications system, the apparatus comprising:
  a transceiver control box adapted to couple to a plurality of base station antennas;
  a transmit path coupled to said transceiver control box;
  a receive path coupled to said transceiver control box;
  a calibration processor coupled to said transmit path and said receive path, said calibration processor configured to operate in both a Code Division Multiple Access (CDMA) technology type and an Orthogonal Frequency Division Multiplexing (OFDM) technology type and operable to perform a calibration for said base station, said calibration processor configured to:
    select one of the CDMA technology type and the OFDM technology type for the wireless base station, the wireless base station comprising an adaptive antenna array; and
    perform a calibration for the wireless base station based on the selected technology type,
  wherein when the calibration processor performs the calibration based on the CDMA technology type, the calibration processor selects a number of CDMA code channels for the calibration, and when the calibration processor performs the calibration in the OFDM technology type, the calibration processor selects a number of OFDM sub-channels for each of the base station antennas for the calibration.

20. The apparatus as set forth in claim 19, the calibration processor operable to perform the calibration by performing at least one of a power calibration, a gain calibration, a transmit complex calibration, and a receive complex calibration.

* * * * *

UNITED STATES PATENT AND TRADEMARK OFFICE
CERTIFICATE OF CORRECTION

| | | |
|---|---|---|
| PATENT NO. | : 8,320,903 B2 | Page 1 of 1 |
| APPLICATION NO. | : 11/221190 | |
| DATED | : November 27, 2012 | |
| INVENTOR(S) | : Ding et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1370 days.

Signed and Sealed this
Twelfth Day of August, 2014

Michelle K. Lee
*Deputy Director of the United States Patent and Trademark Office*